(12) United States Patent  (10) Patent No.: US 6,568,345 B1
Paulo  (45) Date of Patent: May 27, 2003

(54) SELECTABLE INSTRUMENT CLUSTERS

(75) Inventor: Sergio Alexandre Paulo, Kingsville (CA)

(73) Assignee: Yazaki North America, Inc., Canton, MI (US)

( * ) Notice: Subject to any disclaimer, the term of this patent is extended or adjusted under 35 U.S.C. 154(b) by 75 days.

(21) Appl. No.: 09/922,152

(22) Filed: Aug. 6, 2001

(51) Int. Cl.⁷ ................................................ B60K 37/02
(52) U.S. Cl. .................... 116/305; 116/300; 40/506; 180/90; 296/70
(58) Field of Search ................... 116/305, 303, 116/302, 300, 301, 294, 293, 284, 280, 201, 200, 62.4, 62.1, DIG. 3, DIG. 37, DIG. 46; 248/27.1; 40/493, 484, 506; D12/192; 180/90; 296/70, 73

(56) References Cited

U.S. PATENT DOCUMENTS

| 569,384 | A | * | 10/1896 | McKesson | 116/301 |
|---|---|---|---|---|---|
| 1,296,307 | A | * | 3/1919 | Moran | 40/506 |
| 2,423,597 | A | * | 7/1947 | Hurn | 180/90 |
| 2,612,132 | A | * | 9/1952 | Triplett | 116/334 |
| 3,992,070 | A | | 11/1976 | Dunn et al. | |
| 4,459,449 | A | * | 7/1984 | Hirata | 219/720 |
| 4,924,957 | A | | 5/1990 | Gigla | |
| 5,080,516 | A | * | 1/1992 | Ward | 400/717 |
| 5,102,181 | A | * | 4/1992 | Pinkney | 296/37.12 |
| 5,347,734 | A | | 9/1994 | Howell et al. | |
| 5,361,165 | A | | 11/1994 | Stringfellow et al. | |
| 5,735,493 | A | * | 4/1998 | Ditch | 248/27.1 |
| 6,025,820 | A | * | 2/2000 | Salmon et al. | 345/75.1 |
| 6,120,159 | A | | 9/2000 | Inoguchi et al. | |
| 6,460,278 | B1 | * | 10/2002 | Jurjavcic | 40/473 |
| 6,474,431 | B1 | * | 11/2002 | Baker et al. | 180/90 |

FOREIGN PATENT DOCUMENTS

JP 11139182 5/1999

* cited by examiner

Primary Examiner—Diego Gutierrez
Assistant Examiner—R. Alexander Smith
(74) Attorney, Agent, or Firm—Daniel R. Edelbrock

(57) ABSTRACT

An instrument panel comprises multiple instrument clusters with differently arranged display devices. The clusters are selectable and viewable one at a time behind a viewing surface. The clusters are mounted on a single support or frame. A rotating mechanism controlled by a vehicle driver moves the selected cluster into the line of sight of the viewing surface. A source of light backlights only the selected cluster when the selected cluster is lined up with the viewing surface. A reflector between the light sources and cluster spreads the backlighting evenly across the cluster. The light source is set on a PCB that includes a microcontroller for controlling the lights and sending display information to each cluster.

20 Claims, 3 Drawing Sheets

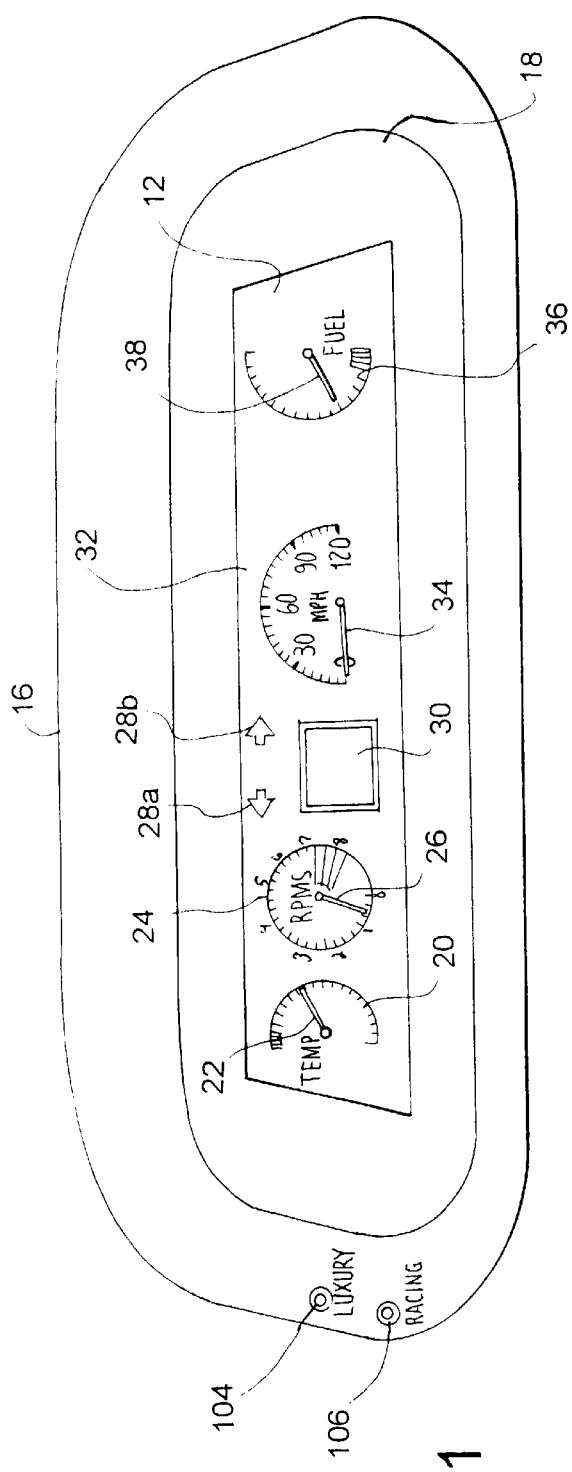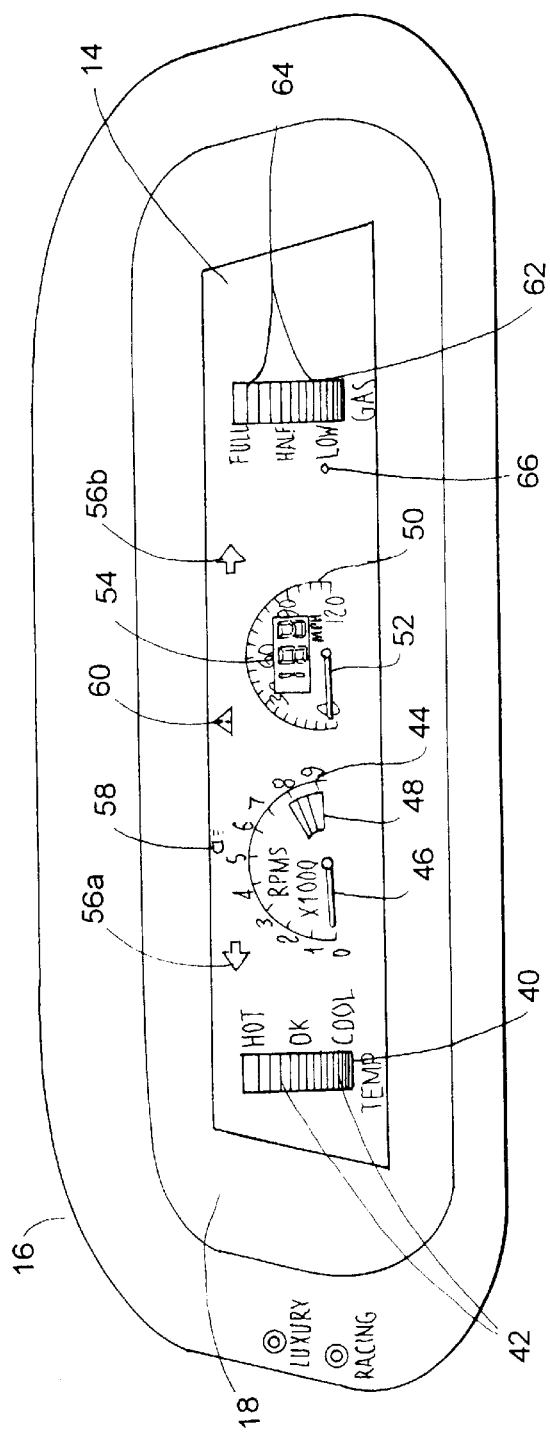
Fig. 1
Fig. 2

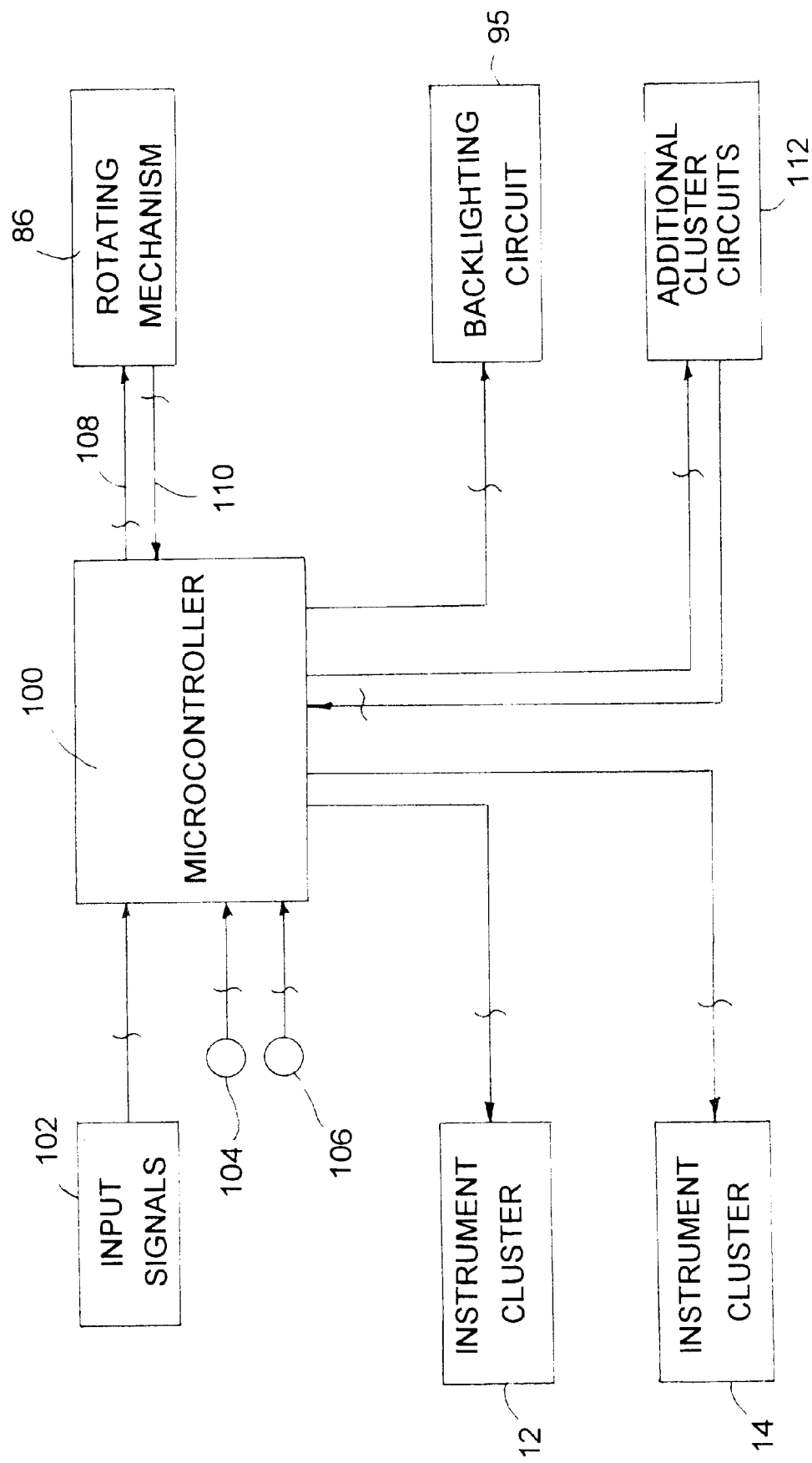

SELECTABLE INSTRUMENT CLUSTERS

BACKGROUND OF THE INVENTION

1. Field of the Invention

The invention is directed in general to instrument clusters for vehicle dashboards and more specifically to optional clusters that may be chosen according to vehicle operator need or desire at any given time.

2. Discussion of Related Art

Typically in a vehicle, an instrument panel is designed to present a particular arrangement of dials, gauges and display screens in a pre-set design. The design is often standard for a vehicle type, while allowing for the addition or substitution of some components if pre-ordered with the vehicle. However, sometimes a single vehicle is used for different purposes. A luxury sport utility vehicle, for example, may be used off-road. A sports car might be used for both racing, even if only in the driver's imagination, and in situations, such as road trips, demanding the conveniences of a luxury automobile. The different conditions would require that the instrumentation indicate or emphasize different vehicle parameters.

Various examples of prior art devices present movable displays and optional instrumentation. In U.S. Pat. No. 3,992,070, a single flip-up instrument panel can be pivoted from a position locked and protected in a housing to a position viewable by a vehicle operator. The instrument panel is intended for use with a tractor-type vehicle to prevent tampering with the panel when the vehicle is stored at a public-accessible site. A counter top display device is detailed in U.S. Pat. No. 5,347,734. Different advertising cards are displayed in a triangular, manually rotatable frame. Japanese patent application Publication No. 11139182A2 discloses an instrument panel having a single lower part and an upper part selectable from a plurality of designs different in meter type, layout and shape. But the upper part must still be selected during the assembly process. In U.S. Pat. No. 6,120,159, an electroluminescent display panel overlaps a section of a conventional instrument panel. The electroluminescent display panel displays additional information at various times during operation of the vehicle while the lighted displays of the overlapped section are turned off. It would be advantageous if the vehicle driver could select a particular instrument cluster arrangement to fit the driver's purpose or the environmental condition at that time, something the prior art references do not suggest.

SUMMARY OF THE INVENTION

Accordingly, it is an object of this invention to provide multiple instrument clusters in a single vehicle selectable by a vehicle operator according to operator desire or driving conditions.

Another object of this invention is to enable the multiple clusters to use common backlighting and circuitry.

A further object of this invention is to provide a simple, relatively inexpensive device for choosing and implementing the selected instrument cluster.

In carrying out this invention in the illustrative embodiment thereof, multiple instrument panels or clusters are mounted on a support or frame to form a display assembly. The frame is mounted within a vehicle dashboard and is rotatable to align a selected instrument cluster with a viewing surface on the dashboard. A vehicle operator can select between these multiple instrument clusters that come built-in with the vehicle by pressing a marked switch or button on the dashboard. The operator can switch between instrument clusters depending on the operating environment. For examples, the separate clusters could be designed for on-road driving, off-road driving, racing, etc. The frame may be made in a multi-dimensional shape. A shallow v-shape, for instance, would enable two different types of backlit displays. When the driver selects the desired display, the display backlighting will shut off temporarily and the frame will rotate. Once the frame is done rotating, the backlighting will turn back on, showing the new display face. All the displays in the cluster use the same circuit for driving the data, including the backlighting circuitry and the microcontroller, keeping the cost minimal.

BRIEF DESCRIPTION OF THE DRAWINGS

This invention, together with other objects, features, aspects and advantages thereof, will be more clearly understood from the following description, considered in conjunction with the accompanying drawings.

FIG. 1 is a front view of a first selectable instrument cluster in an assembly according to the present invention.

FIG. 2 is a front view of a second selectable instrument cluster in the assembly according to the present invention.

FIG. 5 is a block diagram illustrating how the selectable instrument cluster assembly is operated.

DETAILED DESCRIPTION OF THE ILLUSTRATED EMBODIMENT

Figure 3:
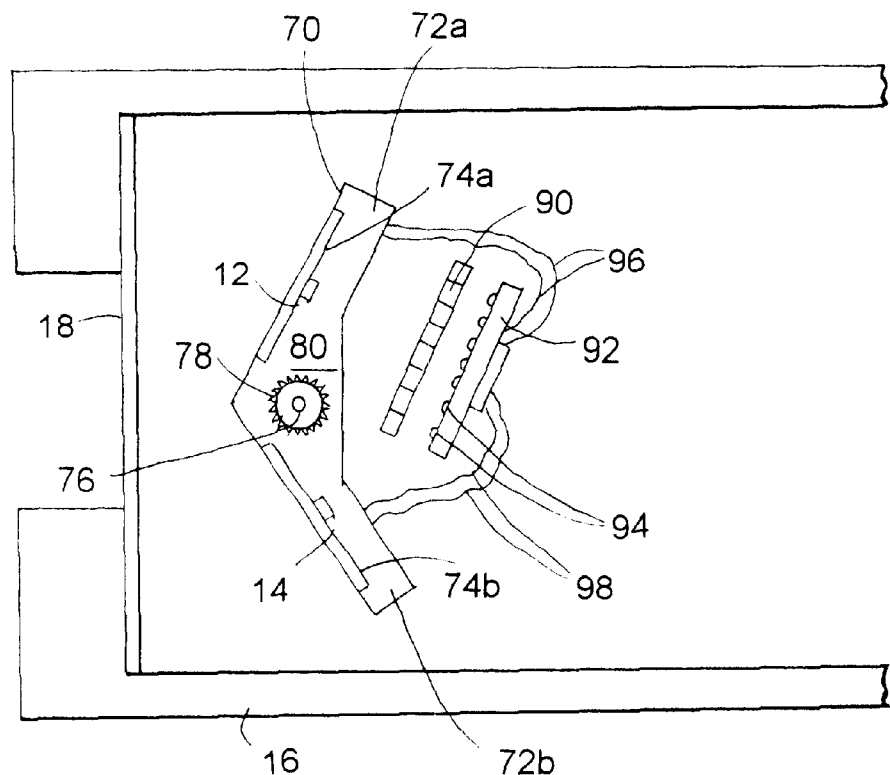
FIG. 3 is a side view of the clusters joined and mounted within a vehicle dashboard.

Referring now to FIGS. 1 and 2, two examples of instrument clusters 12 and 14 for an instrument panel in a vehicle dashboard are illustrated. The instrument clusters 12 and 14 are mounted within an inner part of a vehicle dashboard casing 16 behind a tinted glass or plastic viewing surface 18. The electronic dials, gauges and displays of the clusters could be arranged in any manner and be of any type, as long as they are arranged differently enough on each cluster to provide a desirable choice to the vehicle operator. In FIG. 1, the instrument cluster 12 is designed to present a suggested luxury face. This includes a temperature gauge 20 with a pointer 22, an RPM gauge 24 with a pointer 26, turn signal indicators 28a and 28b, a display screen 30, a speedometer 32 with a pointer 34, and a fuel gauge 36 with a pointer 38. The display screen 30 could be, for example, a liquid crystal display screen for navigational maps.

The instrument cluster 14 of FIG. 2 is designed to provide a racing face, with the chosen dials, gauges and displays arranged in a somewhat more sporty style than the design of luxury instrument cluster 12. A temperature gauge 40 is of the light-up type with different colored levels 42. An RPM gauge 44 with pointer 46 is more prominent, and includes a red zone 48 that may light up to indicate when there are too many RPMs for safe engine operation. A speedometer 50 has both a pointer 52 and a digital speed indicator 54. Turn signal indicators 56a and 56b are more widely spaced. There is a brights-on indicator 58 and a triangular light 60 for indicating whether the hazard lights are operating. A gas gauge 62 is also of the light-up type, with different colored marker levels 64 and a small light 66 providing an additional warning of low fuel. Both of the clusters 12 and 14 may of course include other displays, such as clocks, odometers, battery voltage level indicators, etc. The point is that each cluster presents a different design or face that may be desirable by the vehicle operator depending on the operator's mood, the operator's intended use of the vehicle, or some other factor or environmental condition.

The clusters 12 and 14 are mounted on the outer surfaces of a shallow v-shaped support or frame 70 as part of a display assembly, best shown in FIG. 3. Arms 72a and 72b of the frame have depressions 74a and 74b, respectively, for receiving the clusters such that the display faces point outward. The frame joins the clusters 12 and 14 into a single unit and would include cavities or compartments (not shown) for the operating mechanisms of the gauges, for example stepper motors for moving the pointers. The frame 70 is supported by and turns with a shaft 76 mounted for rotation within the dashboard casing 16. A pinion gear 78 is mounted on the shaft at one end 80 of the frame such that when the pinion gear is turned, the shaft is rotated. The end of the shaft extending from the pinion gear would be received by a bracket or socket (not shown) that, while allowing the shaft to rotate, supports the frame.

Figure 4:
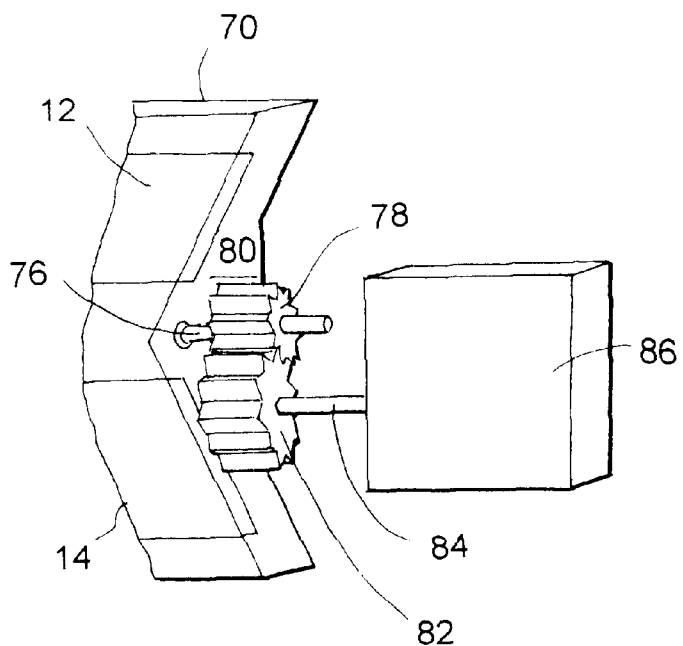
FIG. 4 is a partial perspective view of a rotating mechanism for the joined, selectable instrument clusters.

A drive gear 82, illustrated in FIG. 4, is mounted on a drive shaft 84 extending from a rotating mechanism 86 and meshes with the pinion gear 78. The drive gear 82 is used to turn the pinion gear 78, rotating the frame shaft 76 to position either instrument cluster 12 or 14 in line of sight with the tinted viewing surface 18 of the dashboard casing 16. The frame could be rotated in manners other than by the gears shown, for examples by a rack and pinion mechanism, electronically or even manually by a lever or crank arm. The clusters could also be positioned by movement other than rotational. Such devices and methods are within the scope of this invention.

A light reflector 90 is mounted to the dashboard casing or other support in a fixed position behind the frame 70. A printed circuit board (PCB) 92 is supported in a similar way such that the PCB and reflector do not move and the reflector is between the PCB and the frame 70. The PCB includes a plurality of lights 94 facing the reflector as part of a circuit 95, represented in the block diagram of FIG. 5, for backlighting the instrument clusters. The reflector distributes and spreads the light evenly across the selected cluster. If the operating mechanisms for the gauges mounted in the frame interfere with the backlighting, the mechanisms could be mounted outside of the frame. The PCB has some circuitry common to both clusters and some circuitry specific to either cluster 12 or cluster 14. But there is only one PCB and one reflector designed and positioned to serve both clusters, minimizing costs. Multiple wires 96 (only two are shown for clarity) from the PCB electrically connect with the instrument cluster 12 and multiple wires 98 from the PCB electrically connect with the instrument cluster 14. The wires 96 and 98 are long enough to provide adequate slack so the wires do not hinder movement of the frame and are not disconnected by that movement.

The frame could be shaped in other configurations and hold additional selectable instrument clusters. For examples, the frame could be triangular and hold three instrument clusters, or rectangular to accommodate four instrument clusters. The PCB and reflector could be mounted within the frame. Such configurations would make the circuitry and wiring more complex, and might require additional or differently positioned reflectors and PCBs, but are well within the scope of this invention.

The signals that operate the dials, displays and gauges through the wires 96 and 98 are controlled by a microcontroller 100 illustrated generally in the block diagram of FIG. 5 and located on the PCB 92. The microcontroller receives input signals 102 from devices monitoring the vehicle and engine conditions and from switches or buttons 104 and 106 located on the dashboard casing 16 and accessible by the vehicle operator. The buttons are marked (FIG. 1) in the illustrated embodiment as "luxury" and "racing" to enable the operator to select either cluster 12 or cluster 14, respectively. They may operate, for example, by closing (or opening) a circuit when a particular switch or button is pressed, signaling the microcontroller which cluster has been selected. The microcontroller in turn sends the information to the rotating mechanism 86 through data line 108 to position the selected cluster 12 or 14 in line of sight with the viewing surface 18 of the dashboard casing 16. The microcontroller signals the backlighting circuit 95 of the PCB 92 to shut off the lights 94 while the frame 70 is rotating. The rotating mechanism signals the microcontroller through data line 110 which instrument cluster is in use or viewing position, and the microcontroller activates the circuitry of the viewable cluster through the PCB 92 as well as the backlighting circuit 95 on the PCB. Block 112 presents additional cluster circuits for things such as a global positioning navigation system for feeding information to the luxury display screen 30. The microcontroller 100 receives information from the additional cluster circuits to feed to the displays or gauges and sends signals to the additional cluster circuits providing and asking for information.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A display assembly comprising:
   a support holding multiple, different, separately selectable instrument clusters, the instrument clusters comprising dials, gauges and displays; and
   means for moving the support to position the selected instrument cluster in a location viewable by an observer.

2. The display assembly of claim 1 wherein the support moving means is a mechanism that rotates the selected instrument cluster into the viewable location.

3. The display assembly of claim 2 further comprising a gear mounted on the support, the rotating mechanism engaging the gear to rotate the support.

4. The display assembly of claim 1 wherein the support is a shallow, v-shaped frame.

5. The display assembly of claim 4 wherein the shallow v-shaped frame has first and second arms with outer surfaces, one of the multiple different instrument clusters being mounted on the outer surface of the first arm and another of the multiple different instrument clusters being mounted on the outer surface of the second arm.

6. The display assembly of claim 1 further comprising a printed circuit board mounted adjacent the support, the printed circuit board including at least one light source for illuminating the selected instrument cluster.

7. The display assembly of claim 6 further comprising a reflector mounted between the printed circuit board and the support to distribute and evenly spread the light from the at least one light source onto the selected instrument cluster.

8. The display assembly of claim 6 wherein the printed circuit board further includes circuitry for serving display instruments of each instrument cluster.

9. The display assembly of claim 8 further comprising a microcontroller on the printed circuit board for controlling the support moving means according to an observer input.

10. The display assembly of claim 9 wherein the microcontroller receives inputs from monitoring devices to control the display instruments on the selected instrument cluster.

11. The display assembly of claim 10 wherein the microcontroller is connected to additional circuits for sending information to and receiving information from the display instruments of the selected instrument cluster.

12. The display assembly of claim 8 wherein, the microcontroller is connected to the printed circuit board to light the at least one light source and illuminate the selected instrument cluster when the selected instrument cluster is in the viewable location.

13. An instrument panel comprising:
   a casing;
   a viewing surface on the casing exposing an inner part of the casing;
   at least two instrument clusters positioned within the inner part of the casing such that only one of the at least two instrument clusters is viewable through the viewing surface at a time, each instrument cluster displaying vehicle information in a different design; and
   means for optionally moving any one of the at least two instrument clusters into a position viewable through the viewing surface.

14. The instrument panel of claim 13 wherein the moving means is a rotating mechanism for rotating the said one of the at least two instrument clusters into the viewable position.

15. The instrument panel of claim 13 further comprising a printed circuit board mounted in the inner part of the casing with a light source for illuminating the cluster moved into the viewable position.

16. The instrument panel of claim 15 further comprising a reflector mounted in the inner part of the casing to spread the light from the light source over the instrument cluster moved into the viewable position.

17. The instrument panel of claim 15 further comprising a microcontroller mounted on the printed circuit board for controlling the light source and display information sent to the instrument clusters.

18. An apparatus for providing alternatively arranged electronic information devices, the apparatus comprising:
   a support having a first surface holding a first set of arranged electronic information devices and a second surface holding a second set of alternatively arranged electronic information devices, the first and second surfaces facing in different directions;
   a mechanism operatively connected to the support for selectively moving either the first surface or the second surface into an area in a line of sight of an observer; and
   means for enabling the observer to control the mechanism.

19. The apparatus of claim 18 wherein the enabling means comprises switches electrically connected to the mechanism and accessible by the observer.

20. The apparatus of claim 18 further comprising means for illuminating only the selected first or second surface to the observer.

* * * * *